(12) United States Patent
Gadd et al.

(10) Patent No.: US 8,098,249 B2
(45) Date of Patent: Jan. 17, 2012

(54) APPARATUS AND METHOD FOR AUTOMATIC SCALING OF TICK MARKS

(75) Inventors: Ashley Mark Gadd, Vancouver (CA); James Cochrane, Linz (AT); William Justin Cox, San Diego, CA (US); David Jordan Dalley, San Diego, CA (US); Gerrit Richard Neve, Encinitas, CA (US); Madison Lyndsey Poon, Vancouver (CA)

(73) Assignee: SAP France S.A., Paris (FR)

( * ) Notice: Subject to any disclaimer, the term of this patent is extended or adjusted under 35 U.S.C. 154(b) by 961 days.

(21) Appl. No.: 12/060,118

(22) Filed: Mar. 31, 2008

(65) Prior Publication Data
US 2009/0244089 A1 Oct. 1, 2009

(51) Int. Cl.
*G06T 11/20* (2006.01)
(52) U.S. Cl. ......... 345/440; 345/619
(58) Field of Classification Search .......... 345/440, 345/619
See application file for complete search history.

(56) References Cited

U.S. PATENT DOCUMENTS 5,982,377 A * 11/1999 Yamashita et al. ............ 345/427
2008/0094418 A1* 4/2008 Gerlach et al. ............... 345/660

OTHER PUBLICATIONS

Mathworks, "2.10 How to Set the Tick Locations and Labels", 1994, http://www.math.ufl.edu/help/matlab/tec2.10.html.*

* cited by examiner

*Primary Examiner* — Michelle K Lay
(74) *Attorney, Agent, or Firm* — Mintz, Levin, Cohn, Ferris, Glovsky and Popeo, P.C.

(57) ABSTRACT

A computer readable storage medium includes executable instructions to calculate a default number of major tick marks as a function of a minimum distance between major tick marks and the length of a GUI control. A whole number of major tick marks that evenly divides a range of values to be mapped along the length of the GUI control is iteratively searched. A whole number of major tick marks is displayed along the length of the GUI control. The default number of major tick marks is the origin from which the search begins.

20 Claims, 4 Drawing Sheets

| Component Length (in Pixels) | number of Major Ticks | number of Minor Ticks |
|---|---|---|
| <96 | 3 | 1 |
| 96 - 192 | 5 | 1 |
| 193 - 288 | 5 | 2 |
| 289 - 384 | 10 | 1 |
| 385 - 480 | 10 | 2 |
| > 480 | 10 | 3 |

APPARATUS AND METHOD FOR AUTOMATIC SCALING OF TICK MARKS

FIELD OF THE INVENTION

This invention relates generally to the display of information on a digital device. More particularly, this invention relates to the placement of tick marks on a graphical user interface (GUI) control.

BACKGROUND OF THE INVENTION

A GUI control is a graphical user interface object produced by a software application or a software module to display a measure. For example, the GUI control may be a slider, a progress indicator, a gauge, a dial, and the like. In the case of a slider, a user can select a desired value on by manipulating a mouse to displace a movable component of the slider. With each change in position of the movable component, the slider notifies the associated software application or module of the new value.

Configured with a range of values and a unit of increment between each value, the GUI control can include tick marks to more precisely indicate the position of the movable component. For example, consider a vertically oriented GUI control with the movable component position corresponding to the volume level of a media player. A set of 11 tick marks uniformly spaced over the span of the GUI control divides the range of corresponding levels into 10 intervals. With the bottom tick mark indicating zero output and the top tick mark indicating maximum output, the user can easily determine the selected volume level as a percentage of the maximum output by simply observing the position of the movable component. Increasing the number of tick marks increases the precision. For example, the interval between two tick marks (major tick marks) can be further divided using minor tick marks to increase the precision.

In conventional GUI controls, tick marks are simply placed corresponding to each incremental value along the span of the GUI control. This prior art approach leads to a cumbersome and congested display of tick marks when the unit of increment becomes small or when the number of values in the range increases. A crowded display of tick marks greatly reduces its effectiveness as a simple value indicator.

In another prior art approach, the number of tick marks is hard-coded for each GUI control. This approach is problematic as well. For example, code generation becomes inefficient for an application that uses multiple GUI controls needing different numbers of tick marks. Moreover, code revisions require changes to be implemented on every instance of a GUI control. This approach makes the code generation and the revision processes error-prone.

Therefore, it would be desirable to provide an improved technique for automatic tick mark generation. In particular, it would be desirable to support automatic scaling of tick marks to avoid a crowded display or require manual overhead in hard-coding each GUI control instantiation.

SUMMARY OF THE INVENTION

The invention includes a computer readable storage medium with executable instructions to calculate a default number of major tick marks as a function of a minimum distance between major tick marks and the length of a GUI control. A whole number of major tick marks that evenly divides a range of values to be mapped along the length of the GUI control is iteratively searched. A whole number of major tick marks is displayed along the length of the GUI control. The default number of major tick marks is the origin from which the search begins.

The invention also includes a computer readable storage medium with executable instructions to calculate a whole number of major tick marks as a function of the length of a GUI control, a minimum distance between major tick marks, and a range of values to be mapped along the length of the GUI control. A whole number of major tick marks is displayed along the length of the GUI control.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

Figure 1:
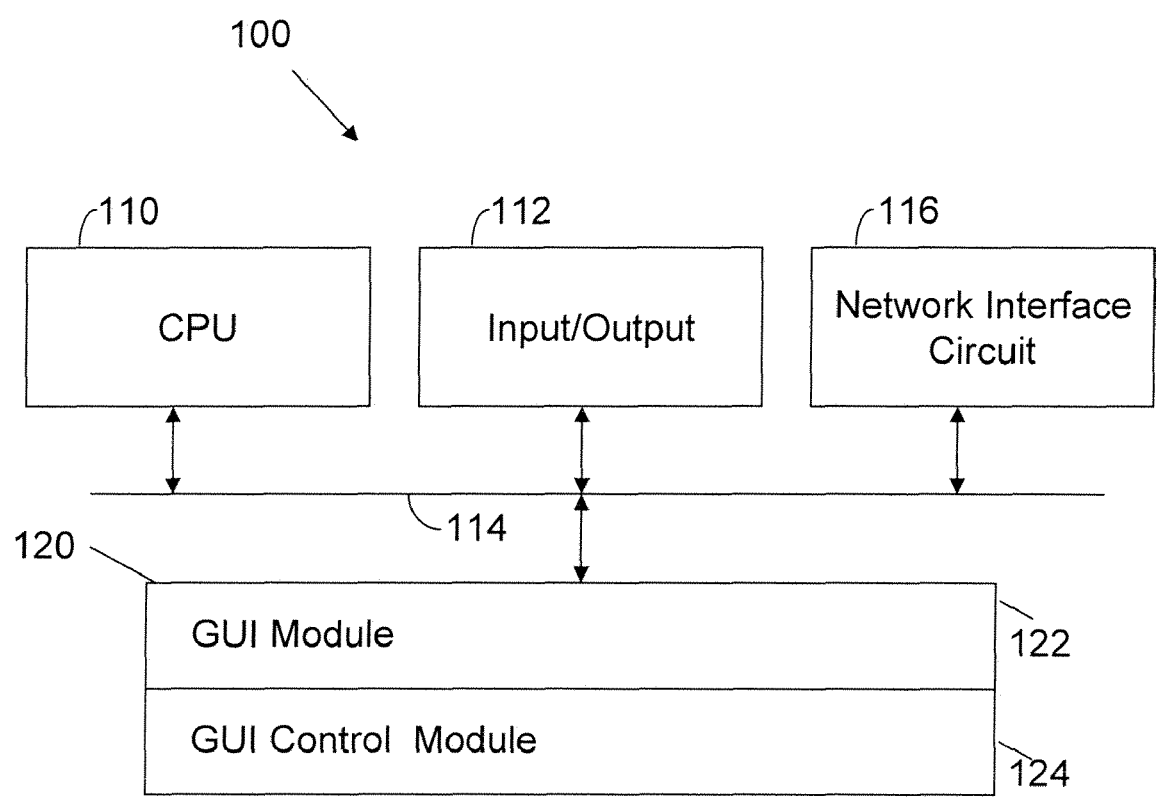
FIG. 1 illustrates a computer system for implementing operations associated with automatically generating tick marks for a GUI control in accordance with an embodiment of the invention.

FIG. 1 illustrates a computer 100 configured in accordance with an embodiment of the invention. The computer 100 includes standard components, such as a central processing unit (CPU) 110 connected to input/output devices 112 via a bus 114. The input/output devices 112 may include a keyboard, mouse, display, printer and the like. A network interface circuit 116 is also connected to the bus 114 to provide connectivity to a network (not shown). Thus, the invention is operative in a networked environment.

A memory 120 is also connected to the bus 114. The memory 120 includes a GUI module 122. A GUI control module 124 is also stored in the memory 120. These modules include executable instructions to implement operations of the invention. In particular, the GUI control module 124 includes executable instructions to calculate the number of tick marks to be displayed along the length of a GUI control. The GUI control module 122 includes executable instructions to generate and display a GUI control.

The GUI control module 124 includes instructions that analyze the length of the slider and a range of values. The instructions calculate an appropriate number of major and minor tick marks. An appropriate number refers to effectively indicating relative positions on the slider, yet providing a non-congested view to the user.

Figure 2:
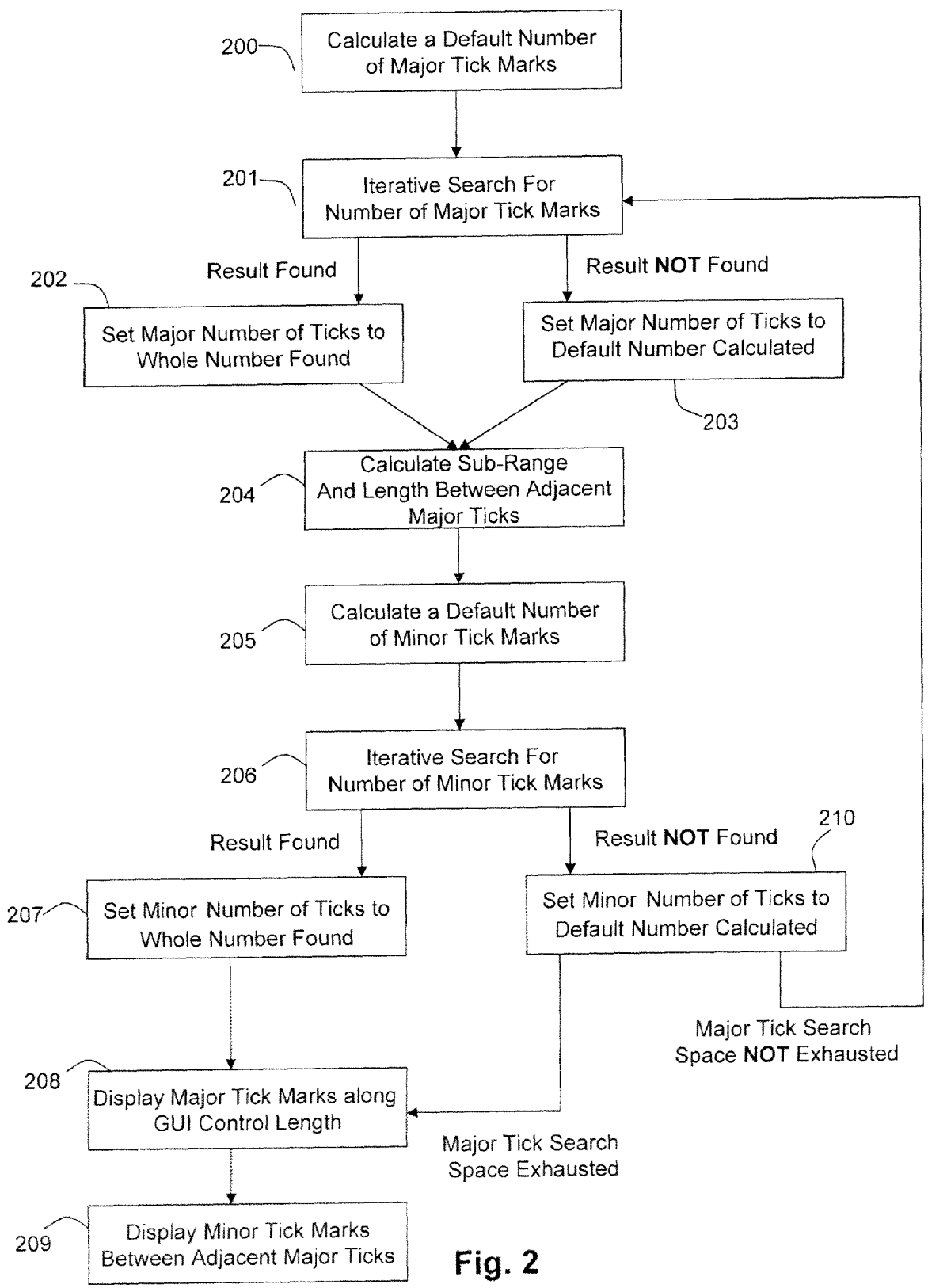
FIG. 2 illustrates processing operations associated with an embodiment of the invention.

FIG. 2 illustrates operations associated with an embodiment of the invention. One embodiment considers a range of values to be mapped along the length of the GUI control, a GUI control length in pixels, a minimum distance between major tick marks, a maximum number of major ticks allowed, and a minimum number of major ticks allowed. Initially, a default number of major tick marks is calculated at 200 by dividing the GUI control length by the minimum distance between major tick marks and then rounding to the nearest whole number. The minimum distance between tick marks is chosen such that the displayed tick marks do not appear congested, but still provides effective indication of relative position along the GUI control length. The default number is then used as the origin from which an iterative search for the number of major tick marks begins.

Figure 3:
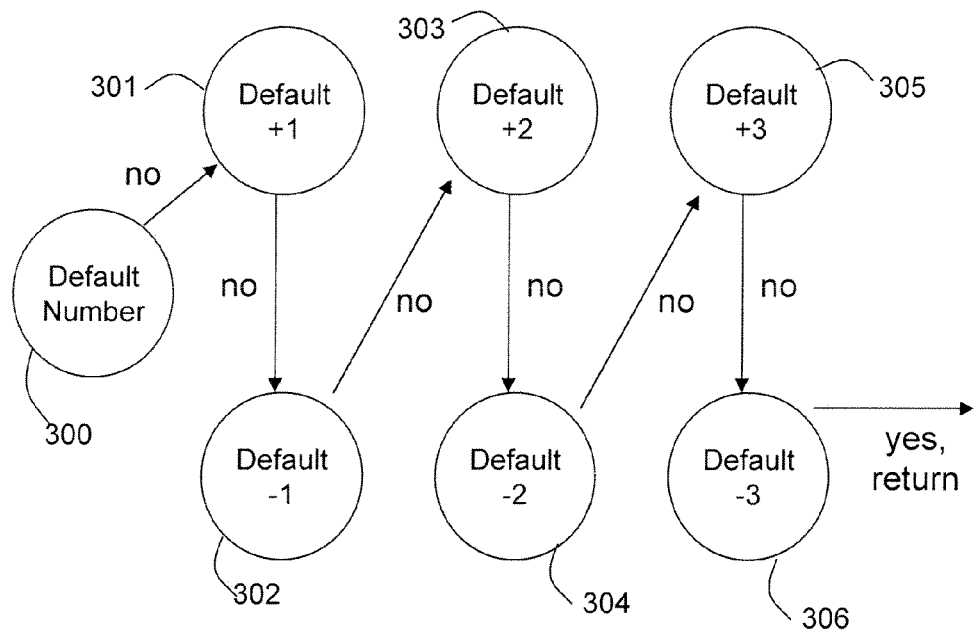
FIG. 3 illustrates an example of an iterative search operation performed in accordance with an embodiment of the invention.

The iterative search 201 starts by checking whether the default number of major tick marks evenly divides the range. If the default number evenly divides the range, the iterative search 201 has found an appropriate number of major ticks. However, if the default number of major tick marks doesn't evenly divide the range, executable instructions alternate between adding and subtracting from the default number until a number that evenly divides the range is found or until the search space is exhausted, which means the iterations have surpassed the maximum number of ticks allowed or have gone below the minimum number of ticks allowed. For example, if the range is 9 and the default number of major tick marks is 5, the search iterates through the list (5,6,4,7,3) until 3 is returned. An example of the iterative process is illustrated by FIG. 3.

If the iterative search 201 finds an appropriate number of major ticks, the number is returned 202. However, if the iterative search doesn't find an appropriate number of major tick marks, the default number is returned 203. The sub-range between adjacent major ticks is then calculated at 204 by dividing the value range by the number of major ticks returned. In addition, the length between adjacent major ticks is calculated at 204 by dividing the GUI control length, in pixels, by the number of major ticks returned.

The calculated sub-range and length between adjacent major ticks is then used to calculate a default number of minor tick marks 205. In one embodiment, the calculation considers a sub-range of values to be mapped between adjacent major tick marks, the length between adjacent major tick marks, a minimum distance between minor tick marks, a maximum number of minor ticks allowed, and a minimum number of minor ticks allowed. An iterative search process to find a whole number of minor tick marks that evenly divides the sub-range begins 206.

If the minor ticks iterative search returns a number 207, then we have found a complete solution and the executable instructions may proceed to display major and minor tick marks on the GUI control at 208 and 209, respectively. However if the iterative search doesn't return an appropriate number 210 and the major tick search space is not exhausted, the operation returns to the major ticks iterative search 201 to find a next number of major tick marks. If the major tick search space is exhausted, the number of minor ticks is set to the calculated default number of minor ticks and the executable instructions may proceed to display major and minor tick marks on the GUI control at 208 and 209, respectively.

The basic logic is that if a number for major tick marks is found, the corresponding number of major tick marks will be displayed. Otherwise, the default number of major tick marks will be displayed. If a number for minor tick marks is found, the corresponding number of minor tick marks will be displayed. Otherwise, the default number of minor tick marks will be displayed.

FIG. 3 illustrates an example of an iterative search operation performed in accordance with an embodiment of the invention. The iterative search starts with the default number of tick marks 300. If the default number doesn't evenly divide the range, the next iteration 301 will check whether (default number+1) evenly divides the range. If (default number+1) does not evenly divide range, the next iteration 302 will check whether (default number−1) evenly divides the range. This search process continues, alternating between adding and subtracting from the default number (i.e., 303, 304, 305, . . . ), until either a number that evenly divides the range is found, in this case at 306, or the iterations have surpassed the maximum number of ticks allowed or have gone below the minimum number of ticks allowed.

Figures 4, 6:
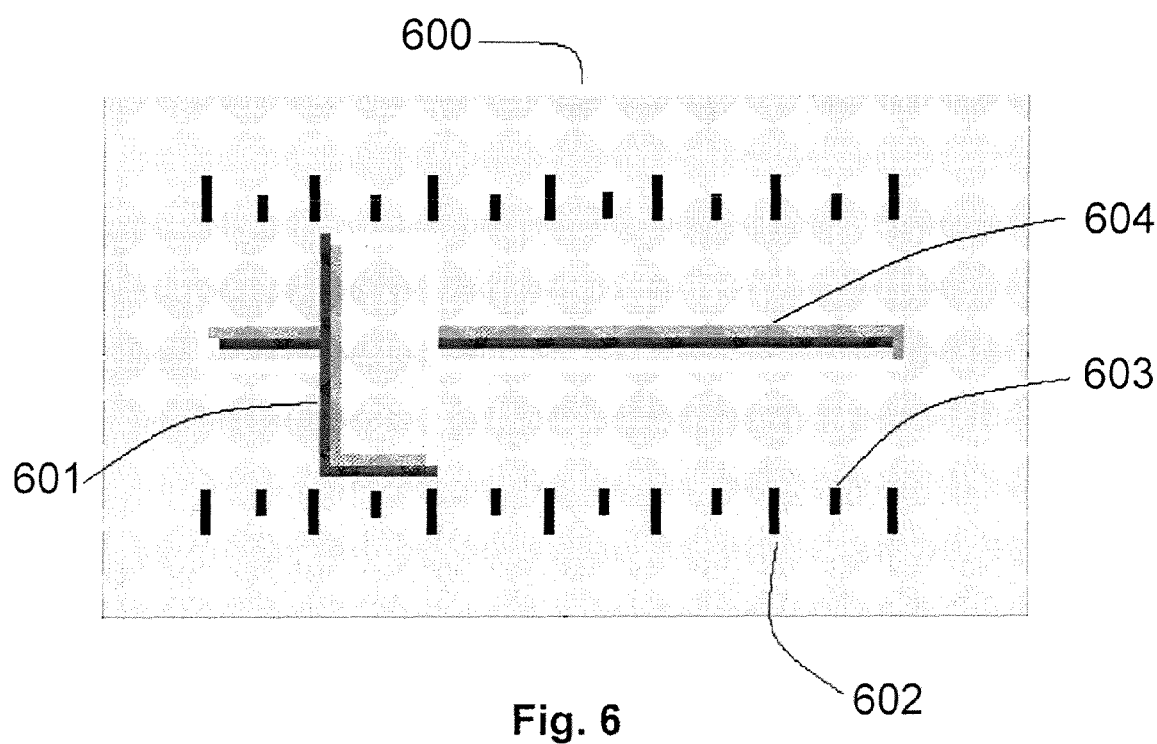
FIG. 4 illustrates an aesthetic table used in an embodiment of the invention.
FIG. 6 illustrates a GUI control in the form of a slider configured in accordance with an embodiment of the invention.

FIG. 4 illustrates an aesthetics table used in another embodiment of the invention. It comprises columns and rows specifying slider length ranges, numbers of major ticks, and numbers of minor ticks. The aesthetics table may be constructed using the operations in FIG. 2.

Figure 5:
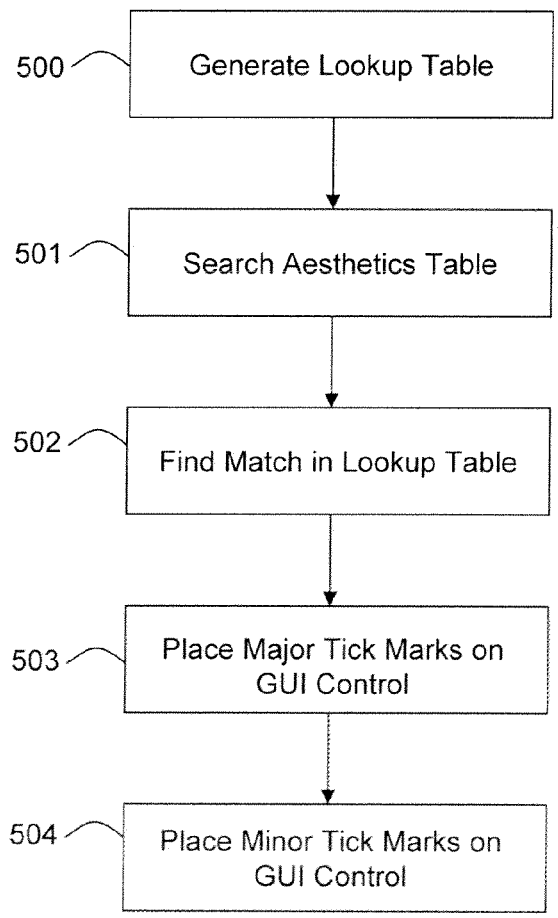
FIG. 5 illustrates processing operations associated with another embodiment of the invention.

FIG. 5 illustrates processing operations associated with the aesthetics table. In this embodiment, given a range of values, a lookup table listing all divisors as possible combinations of ticks and increments is created 500. The list of divisors may be compared to the increment size to determine how feasible they are. (e.g., a range of 1000 with an increment size of 100 doesn't need to list 1 and 2 as divisors).

Given the slider length in pixels, the aesthetics table provides the visually optimal number of major ticks to use as well as the visually optimal number of minor ticks to use 501. Accordingly, looking up the visually optimal number of major ticks (found from the aesthetics table) in the lookup table of divisors for the closest match, the corresponding increment value can be found 502. Using this increment value, the major ticks are displayed along the GUI control 503 while the minor ticks are placed between each major tick 504.

FIG. 6 illustrates a GUI control in the form of a slider 600 configured in accordance with an embodiment of the invention. The slider 600 includes a slider track 604 on which the movable component 601 can be positioned. Spanning the length of the slider track are major tick marks 602 and minor tick marks 603. In the illustrated slider interface, the generated tick marks are aligned on both sides of the slider track. However, in other configurations, the generated tick marks can be aligned on either side of the slider track.

An embodiment of the present invention relates to a computer storage product with a computer-readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium, comprising executable instructions to:
   calculate a default number of major tick marks as a function of a minimum distance between major tick marks and a length of a graphical user interface (GUI) control;
   iteratively search for a whole number of major tick marks that evenly divides a range of values to be mapped along the length of the GUI control; and
   display a number of major tick marks along the length of the GUI control according to the whole number;
   wherein the default number of major tick marks is an origin from which the iterative search of the whole number of major tick marks begins.

2. The computer readable storage medium of claim 1, further comprising executable instructions to:
   calculate a default number of minor tick marks as a function of a minimum distance between minor tick marks and a length between adjacent major tick marks;
   iteratively search for a whole number of minor tick marks that evenly divides a sub-range of values to be mapped between adjacent major tick marks; and
   display a number of minor tick marks between adjacent major tick marks according to the whole number of minor tick marks;
   wherein the default number of minor tick marks is an origin from which the iterative search of the whole number of minor tick marks begins.

3. The computer readable storage medium of claim 1, further comprising executable instructions to:
   identify a set of whole number major tick marks appropriate for a set of GUI control lengths; and
   load the set of whole number major tick marks and the set of GUI control lengths in a table.

4. The computer readable storage medium of claim 2, further comprising executable instructions to:
   identify a set of whole number minor tick marks appropriate for a set of GUI control lengths; and
   load the set of whole number minor tick marks and the set of GUI control lengths in a table.

5. The computer readable storage medium of claim 1, further comprising executable instructions to set maximum and minimum bounds to limit iterative searches of the whole number of major tick marks.

6. The computer readable storage medium of claim 2, further comprising executable instructions to set maximum and minimum bounds to limit iterative searches of the whole number of minor tick marks.

7. The computer readable storage medium of claim 1 wherein the default number of major tick marks is calculated by dividing the length of the GUI control by the minimum distance between major tick marks and then rounding to a nearest whole number.

8. The computer readable storage medium of claim 2 wherein the default number of minor tick marks is calculated by dividing the length between adjacent major tick marks by the minimum distance between minor tick marks and then rounding to a nearest whole number.

9. A non-transitory computer readable storage medium, comprising executable instructions to:
   calculate a whole number of major tick marks as a function of a length of a graphical user interface (GUI) control comprising a graphical pane, a minimum distance between major tick marks, and a range of values to be mapped along a the length of the GUI control; and
   display a number of major tick marks along the length of the GUI control according to the whole number.

10. The computer readable storage medium of claim 9, further comprising executable instructions to:
    calculate a whole number of minor tick marks as a function of the length between adjacent major tick marks, a minimum distance between minor tick marks, and a sub-range of values to be mapped between adjacent major tick marks; and display a number of minor tick marks between adjacent major tick marks according to the whole number of minor tick marks.

11. The computer readable storage medium of claim 9, further comprising executable instructions to:
    identify a set of whole number major tick marks appropriate for a set of GUI control lengths; and
    load the set of whole number major tick marks and the set of GUI control lengths in a table.

12. The computer readable storage medium of claim 10, further comprising executable instructions to:
    identify a set of whole number minor tick marks appropriate for a set of GUI control lengths; and
    load the set of whole number minor tick marks and the set of GUI control lengths in a table.

13. The computer readable storage medium of claim 9, further comprising executable instructions to set maximum and minimum bounds for the whole number of major tick marks.

14. The computer readable storage medium of claim 10, further comprising executable instructions to set maximum and minimum bounds for the whole number of major tick marks and the whole number of minor tick marks.

15. A method for implementation by one or more data processors comprising:
    calculating, by at least one data processor, a default number of major tick marks as a function of a minimum distance between major tick marks and a length of a graphical user interface (GUI) control;
    iteratively searching, by at least one data processor, for a whole number of major tick marks that evenly divides a range of values to be mapped along the length of the GUI control; and
    displaying, by at least one data processor, a number of major tick marks along the length of the GUI control according to the whole number;
    wherein the default number of major tick marks is an origin from which the iterative search of the whole number of major tick marks begins.

16. The method of claim 15 further comprising:
    calculating, by at least one data processor, a default number of minor tick marks as a function of a minimum distance between minor tick marks and a length between adjacent major tick marks;
    iteratively searching, by at least one data processor, for a whole number of minor tick marks that evenly divides a sub-range of values to be mapped between adjacent major tick marks; and displaying, by at least one data processor, a number of minor tick marks between adjacent major tick marks according to the whole number of minor tick marks;

wherein the default number of minor tick marks is an origin from which the iterative search of the whole number of minor tick marks begins.

17. The method of claim 15 further comprising:

identifying, by at least one data processor, a set of whole number major tick marks appropriate for a set of GUI control lengths; and loading, by at least one data processor, the set of whole number major tick marks and the set of GUI control lengths in a table.

18. The method of claim 16 further comprising:

identifying, by at least one data processor, a set of whole number minor tick marks appropriate for a set of GUI control lengths; and loading, by at least one data processor, the set of whole number minor tick marks and the set of GUI control lengths in a table.

19. The method of claim 16, further comprising:

setting, by at least one data processor, maximum and minimum bounds to limit iterative searches of the whole number of major tick marks; and setting, by at least one data processor, maximum and minimum bounds to limit iterative searches of the whole number of minor tick marks.

20. The method of claim 16, wherein:

the default number of major tick marks is calculated by dividing the length of the GUI control by the minimum distance between major tick marks and then rounding to a nearest whole number; and the default number of minor tick marks is calculated by dividing the length between adjacent major tick marks by the minimum distance between minor tick marks and then rounding to a nearest whole number.

\* \* \* \* \*